US007907728B2

(12) United States Patent
Stevens

(10) Patent No.: US 7,907,728 B2
(45) Date of Patent: Mar. 15, 2011

(54) METHOD AND SYSTEM OF TRANSFERRING SCRAMBLED CONTENT

(75) Inventor: Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1214 days.

(21) Appl. No.: 11/290,771

(22) Filed: Nov. 30, 2005

(65) Prior Publication Data

US 2007/0121941 A1    May 31, 2007

(51) Int. Cl.
*H04N 7/167* (2006.01)
(52) U.S. Cl. ...................................................... 380/210
(58) Field of Classification Search .................. 380/218, 380/258, 210; 713/151, 153, 168, 189, 193; 725/2, 31, 82
See application file for complete search history.

(56) References Cited

U.S. PATENT DOCUMENTS

| | | | | |
|---|---|---|---|---|
| 6,317,500 | B1 * | 11/2001 | Murphy | 380/258 |
| 6,574,609 | B1 * | 6/2003 | Downs et al. | 705/50 |
| 6,961,430 | B1 * | 11/2005 | Gaske et al. | 380/216 |
| 7,562,379 | B2 * | 7/2009 | Hardacker et al. | 725/81 |
| 7,614,069 | B2 * | 11/2009 | Stone | 725/89 |
| 2005/0177853 | A1 * | 8/2005 | Williams et al. | 725/81 |
| 2006/0071824 | A1 * | 4/2006 | Kim et al. | 341/50 |
| 2006/0127039 | A1 * | 6/2006 | van Stam | 386/94 |

OTHER PUBLICATIONS http://www.slingmedia.com/slingbox/; date printed Oct. 10, 2005.

* cited by examiner

*Primary Examiner* — Beemnet W Dada
(74) *Attorney, Agent, or Firm* — Brooks Kushman P.C.

(57) ABSTRACT

Method and system of transferring scrambled content from location to another. The method and system may include transferring the scrambled content without requiring the descrambling thereof. The method and system may be used to transfer live content, stored content, and the like. The content may relate to television programming and signaling, data, still images, audio, and the like.

20 Claims, 2 Drawing Sheets

METHOD AND SYSTEM OF TRANSFERRING SCRAMBLED CONTENT

BACKGROUND OF THE INVENTION

1. Field of the Invention

The present invention relates to methods and systems of transferring scrambled content from one location to another.

2. Background Art

Television signaling, data transfers, mobile communications, and any number of other forms of electronic communications scramble content prior to communicating the content to users thereof. The scrambling may be implemented according to any number cryptographic methods and systems, and is often proprietary to the content source. Upon receipt of the content, the destination entity must descramble the signals in order to access the services associated therewith.

SUMMARY OF THE INVENTION

One non-limiting aspect of the present invention relates to a method of transmitting content scrambled by a media provider thereof. The method may include geographically storing the content scrambled across a number of separate geographic locations, each location including a network storage element for storing the geographically located content, the storage elements including capabilities to facilitate transporting the stored content to other geographic locations without requiring descrambling of the content.

The method may further include transmitting stored content from an origination location to a destination location, the origination and destination locations being one of the geographic locations, wherein the content is received at the destination location without requiring descrambling between the origination and destination locations.

The method may further include establishing a establishing a conditional access (CA) arrangement between the network and the destination location to permit descrambling of the delivered content. Optionally, the CA arrangement may require the destination location to support descrambling scrambled television signals.

The method may further include storing at least a portion of the content on a number of pieces of customer premise equipment (CPE), the CPE comprising at least a portion of the network storage elements used for storing the geographically located content and having the capabilities to facilitate transporting the stored content over the network to other geographic locations such that at least a portion of the content delivered to the destination location is associated with at least one of the pieces of CPE.

The method may further include storing at least a portion of the content on a number of cable headends, the cable headends comprising at least a portion of the network storage elements used for storing the geographically located content and having the capabilities to facilitate transporting the stored content over the network to other geographic locations such that at least a portion of the content delivered to the destination is associated with at least one of the headends.

The method may further include transmitting the signals as digital signals and without requiring conversion to analog signals.

The method may further include identifying a user associated with the destination location and limiting content delivered thereto to content associated with the identified user. This may include requiring the identified user to be associated with the origination location in order to be transmitted content therefrom. Optionally, the method may include automatically synchronizing the identified user with content from the origination location upon determining the identified user to be at the destination location.

The method may further include determining a quality of service for the destination location, the quality of service specifying signaling quality associate with signals used to deliver the content to the destination location.

The method may further include defining each geographical location as an independent area serviced scrambled television signals from a regional access point. The method may further include the regional access points receiving common content over the network from a service provider such that the regional access points then distribute the common content over local networks to customer premises equipment (CPE).

One non-limiting aspect of the present invention relates to a method of delivering scrambled television signals. The method may further include transferring scrambled television signals from an origination location to a destination location, the origination and destination locations being associated with different geographic regions, wherein the television signals are received at the destination location without being descrambled between the origination and destination locations.

The method may further include geographically storing the scrambled television signals across a number of network storage elements associated with a number of different geographic regions and transferring the scrambled television signals from one of the network storage elements.

The method may further include storing the scrambled television signals without descrambling.

The method may further include identifying a user associated with the destination location and limiting content delivered thereto to content associated with the identified user.

The method may further include requiring the identified user to be associated with the origination location in order to be transmitted content therefrom.

One non-limiting aspect of the present invention relates to a system for delivering scrambled television signals. The system may include a media provider associated with providing the scrambled television signals, a number of geographical locations having a number of storage elements for storing the scrambled television signals, wherein the media provider includes capabilities to transfer scrambled television signals from an origination location to a destination location, each location being associated with different geographic locations, wherein the scrambled television signals are transmitted between the different geographic locations without requiring descrambled of the scrambled television signals.

The system may include a regional access point for a number of the geographic locations, the regional access point configured to receive the scrambled television signals from the media provider for distribution to the storage elements.

The storage elements may receive the scramble television signals from the associated regional access point by way of signals carried over a local area network such that transfer scrambled television signals from the origination to destination locations requires transferring signals between different local area networks.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
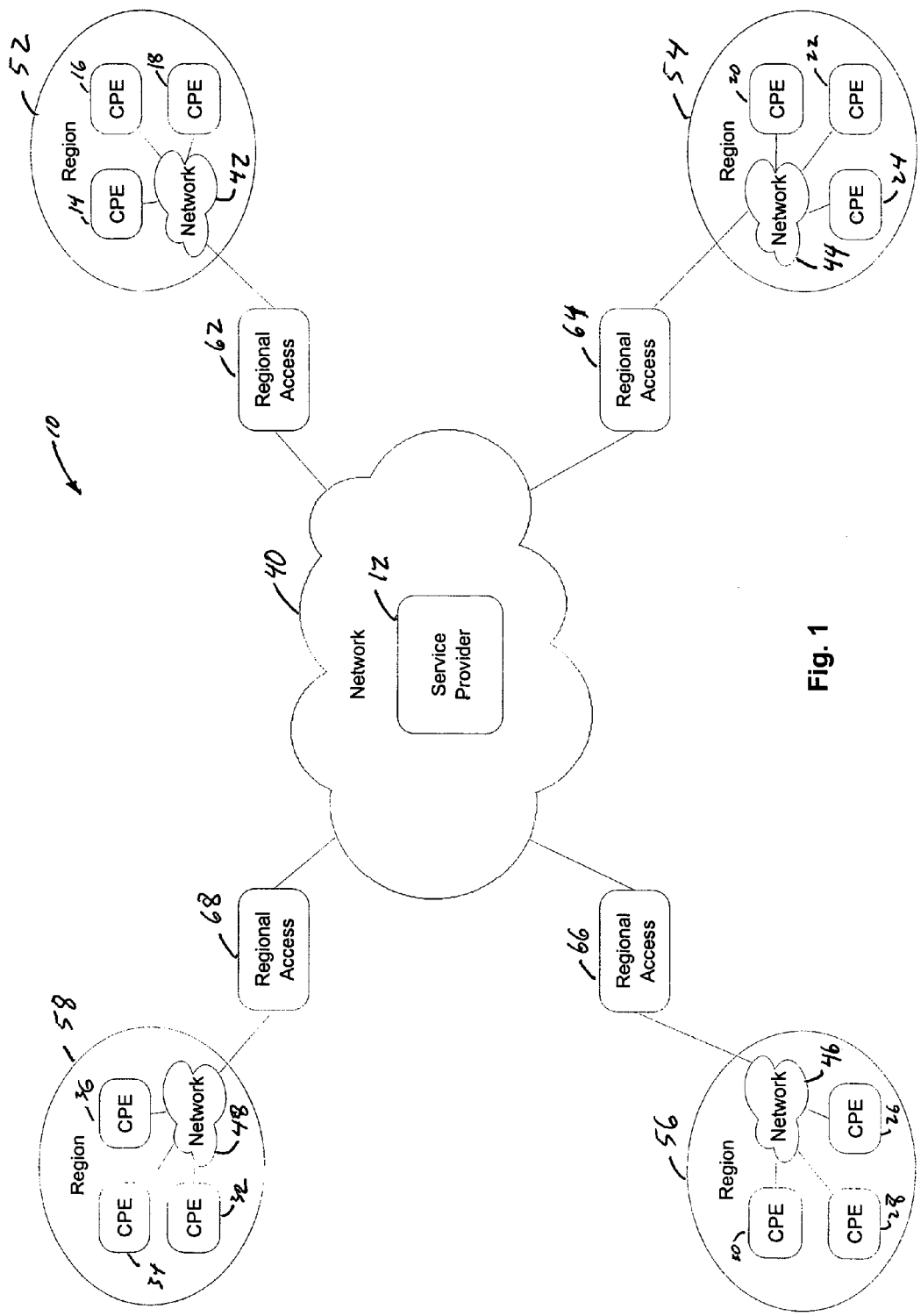
FIG. 1 illustrates a system for delivering scrambled television signals in accordance with one non-limiting aspect of the present invention.

FIG. 1 illustrates a system 10 for delivering scrambled television signals in accordance with one non-limiting aspect of the present invention. The system 10 generally relates to any system having a media provider 12, or similar entity, configured to distribute scrambled television signals to a number of pieces of customer premise equipment (CPE) 14-36.

Advantageously, as described below in more detail, the system 10 permits the television signals or other scrambled content to be transferred without requiring the descrambling thereof. This allows the media provider 12 to continuously control access, protection, and descrambling of the signals and content even after being distributed to the CPE 14-36 for usage.

The system 10 may relate to terrestrial and/or extraterrestrial systems, such as terrestrial broadcast, satellite, and cable television systems. One or more wireless and/or wireline networks may be included to facilitate transferring the signals between the media provider 12 and CPE 14-36. Optionally, a primary or wide area network (WAN) 40 may be used by the media provider to communicate signals with any number of secondary or local area networks (LANs) 42-48 associated with the CPE 14-36.

In this manner, television signals or other content originating form the media provider 12 and/or the CPE 14-36 may be simultaneously and/or individually delivered to the LANs 42-48 for subsequent distribution to the CPE 14-36 associated therewith. Each of the LANs 42-48 may be associated with a different geographical region 52-58. This may be done to separate television programming, such as by region 52-58, and/or for other reasons, such as network communication restrictions, government regulation, and the like.

One or more regional access points 62-68 may be included to facilitate interfacing signals between the media provider 12 and the LANs 42-48. The regional access points 62-68 may correspond with routers, hubs, switch, and other features having capabilities suitable to relaying signals between the media provider and a number of pieces of CPE. As shown, each geographical region 52-58 may be identified and associated with a corresponding regional access point 62-68 and LAN 42-48.

In accordance with one non-limiting aspect of the present invention, the regional access points 62-68 may be headend units 62-68 commonly employed by cable television providers. As one skilled in the art will appreciate, the headend units 62-68 may be configured to receive television signals from the media provider 12 and to manipulate the received signals for subsequent delivery to the CPE 14-36.

The headend units 62-68 may include any number of features and capabilities for supporting signals delivered to the CPE 14-36 and/or to support the operation thereof. For example, the headend units 62-68 may include features for programming and controlling operation of the CPE 14-36 and/or features for providing applications thereto, such as electronic programming guides (EPGs), video on demand (VOD), interactive gaming, enhance/interactive television (ETV/iTV), pay-per-view (PPV), digital video recording (local and remote), and the like.

Likewise, the headend units 62-68 may include capabilities for scrambling and descrambling the television signals or other content and controlling access thereto. In more detail, the headend units 62-68 may be configured to receive scrambled and non-scrambled signals from the media provider 12 and to re-package these signals into other scrambled signals for subsequent delivery to the associated LANs 42-48. In this manner, signaling between the headend units 62-68 and CPE/LANs 14-36,42-48 are scrambled according to parameters specified by the media provider 12 and/or associated headend 62-68.

The system 10, for exemplary purposes, is described with respect to delivering the scrambled television signals or other content from one location (origination location) to another (destination location). The television signals may be associated with television programs, movies, and/or other definable segments of content. The television signals may also be associated with live/real-time broadcast and/or non-linear transmissions, such as video on demand and the like. Of course, the present invention is not intended to be limited to television signaling and fully contemplates the signals being associated with non-television signaling, such as content signals associated with data operations (high-speed data), audio, still images, applications, telephony, and the like.

The CPE 14-36 may relate to any number of devices having capabilities suitable for interfacing signals with the user thereof, including a settop box (STB), outlet digital adapter (ODA), media terminal adapter (MTA), cable modem (CM), personal digital assistant (PDA), computer, mobile device (phone, computer, etc.), integrated television feature/application, and any other item having capabilities to supporting access to any number of services, including television services associated with the encrypted television signals. Moreover, the CPE 14-36 may be associated with households and other entities, such as hotels, offices, etc., such that subscribers may access services through any number of locations.

Optionally, the media provider 12, regional access points 62-68, and/or CPE 14-36 may be configured to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

Figure 2:
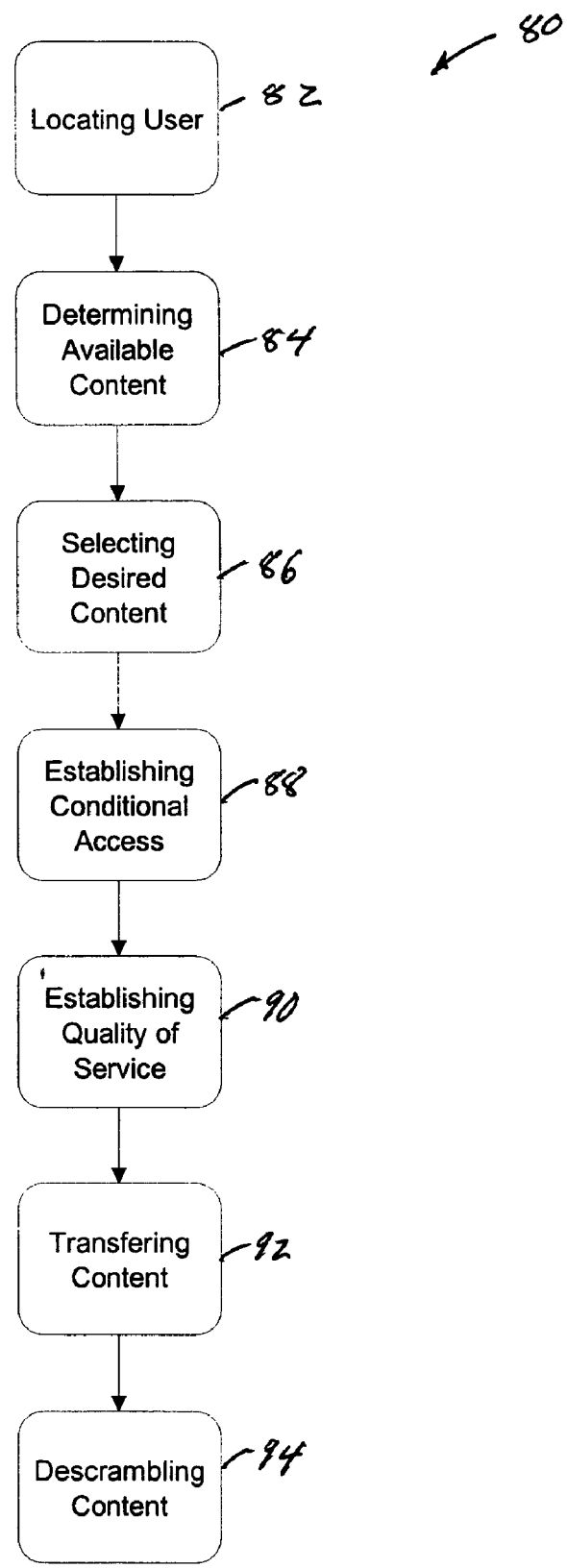
FIG. 2 illustrates a flowchart of a method of transferring scrambled content in accordance with one non-limiting aspect of the present invention.

FIG. 2 illustrates a flowchart 80 of a method of transferring scrambled content in accordance with one non-limiting aspect of the present invention. The method generally relates to transferring any type of content from one location to another, and for exemplary purposes only, is described with respect to transferring scrambled television signals from one location to another. This exemplary illustration is not intended to limit the scope and contemplation of the present invention.

Block 82 relates locating a user who has relocated from their primary location to a secondary location within in one of the geographical regions 52-58. The primary location of the user may correspond with their home or other principle location where they predominately access services associated with the media provider 12. This location may be specified in a subscription or through other means specified by the media provider. The secondary location may correspond with a location of the user when the user is away from their primary location, such as at work, a second home, etc.

For example, the primary location of the user may corresponding to a primary CPE 14-36 within one of the geographical regions 52-58. The secondary location of the user may correspond with the user being at another piece of CPE 14-36 located within the same geographical region 52-58 and/or at another piece of CPE 14-36 located within a different geographical region 52-58. As such, the location of the user is defined as a combination of the device used to access services and the region in which that device is located.

Locating the user may include the user logging into a portal, webpage, or other feature associated with the media provider 12, such as by entering a personal identification number (PIN) or other identifier into an EPG supported on a STB or television associated with one or more of the pieces of CPE 14-36. The device 14-36 supporting the user login operation may communicate location signals to the media provider 12 to facilitate locating the user and the corresponding geographical region. The media provider 12 and/or a feature associated therewith may use this information to determine whether the user has relocated to a secondary location.

Block 84 relates to determining content available for the identified user. This may include considering any number of options and parameters, such as the user's subscription services, content stored by the user on a home recording feature, content broadcasted or stored for on-demand viewing from the regional access point associated with the user's primary location, and content available from other storage elements within the system, such as from the various pieces of CPE 14-36.

In more detail, the user may subscribe to subscription service that allows the user to access television programming or other content provided at or stored on their primary location when the user is not within a region serviced by their primary location, i.e. the user may be located in another state or a different time-zone. The media service provider 12 may determine the content currently being broadcasted to and/or otherwise available from the primary location as content available to the user.

The available content may also relate to content previously stored by the user on at their primary location, such as on their personal DVR. The DVR or other recording device associated therewith may be configured to periodically alert the media provider 12 to the content stored thereon and/or the media service provider 12 may be configured to poll the primary storage element for the content stored thereon.

Similarly, the available content may be broadcasted from the regional access point 62-68 associated with the primary location of the user. For example, the regional access point 62-68 may be broadcasting a live sporting event or other program such that this content may be determined as the content available to the user. Likewise, other content stored on the regional access point 62-68 associated with the primary location of the user may also be available to the user, such as movies, games, VOD, etc.

Of course, any other storage element within the system (CPE 14-36, other regional access points 62-68, etc.) may include content available to the user. This may encompass a rather large quantity of material and require some other manipulation in order to manage the available content. For example, the media service provider 12 may limit the available content to content that is not currently available from the user's current location.

Block 86 relates to selecting one or more of the available content choices for transfer to the user. The media provider 12 may be configured to output signals associated with the available content to the device used by the user at the secondary location. The signals may be configured to the device at the secondary location so as to facilitate displaying the available selections within an EPG of a STB, on a webpage accessed by a computer, and/or through some other user interface available to the user. Billing and other options may be included within the user interface to indicate charges for the content and/or to permit advertisements.

Block 88 relates to establishing a conditional access (CA) arrangement with the devise used by the user at the secondary location. The CA arrangement is an arrangement commonly used in television signaling to permit scrambled television signals to be descrambled for play back. As one skilled in the art will appreciate, the source of television signaling (regional access point 62-68 and/or media service provider 12) are desirous of protecting the television signals (or other content) from being accessed by unauthorized individuals.

The CA arrangement is generally a proprietary arrangement that requires a special set of decryption keys from the content source in order to facilitate descrambling the desired content. The CA arrangement can be advantageous when transferring content from one location to another as it permits the signals associated therewith to be transferred without requiring descrambling, i.e., in their originally scrambled form (stored).

For example, if the device at the secondary location of the user is a computer, the CA arrangement may require the downloading of an application for use by the computer in descrambling the television signals. This can be advantageous in permitting the user to view television signals at a remote work location or while traveling. Likewise, if the user is at another location associated with the media provider, such as at another STB, the CA arrangement may require the exchange of additional keys, in addition to those already included on the STB, to support descrambling signals scrambled according to a different methodology associated with the user's primary location or other location from which the desired content originates.

Block 90 relates to establishing a quality of service (QoS) for transferring the desired content to the secondary location. The QoS governs signal quality and other parameters associated with transferring the signals to the current location of the user. For example, each subscriber may specify a desired QoS, such as based on desired parameters for transfer speed, loss rates, corruption rates, error rates, latency, etc. Based on these QoS parameters, communication paths between the origination and destination locations may be tested to determine whether they meet the QoS objectives such that paths meeting the objectives may be used to transfer the scrambled content.

Block 92 relates to transferring the desired content to the user at the secondary location. This may include any number of operations and issuing any number of control signals. For example, if the content is originating from another STB, DVR, or other CPE 14-36, the media provider 12 may communicate signals thereto for instructing the device to transfer the content the secondary location. Addressing and other instructional signals may be include to facilitate delivering the content directly to the secondary location and/or routing the content through the WAN 40 (media provider) for subsequent delivery to the secondary location.

In accordance with one non-limiting aspect of the present invention, the content, which for exemplary purposes is scrambled television signals, is transferred in its scrambled state. With respect to transferring content from the CPE 14-36, the content may be stored in its originally scrambled state (i.e., as received from the media provider 12 or other source) and transferred as is, without any descrambling and re-encryption, to the secondary location. This can be advantageous in limiting processing associated with securing and transportation the content over non-secured networks, such as if the secondary connection is through a public network that cannot be secured by the media provider 12. This can also be advantageous in synchronizing the user's content while traveling between locations, such as by automatically coordinating data stored at their primary location with a device used at the secondary location.

Block 94 relates to descrambling the received content at the secondary location. The CA arrangement established with the device at the secondary location may be used to descramble the content. The device may then interface the services associated therewith with the user. Optionally, metadata or other data may be included with the scrambled content to further control access thereto. For example, access to the scrambled content may be restricted to parameters associated with the user's primary location such that when the same content is accessed from the secondary location, it is correspondingly restricted.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of facilitating playback of a television program from a remote location in communication with a television network through an IP network, the television network being associated with a television service provider that transmits scrambled television signals to plurality of subscriber locations, the method comprising:
    receiving the scrambled television signals with a first output device connected to the television network at one of the subscriber locations, the scrambled television signals being used to simultaneously transmit a plurality of television programs within a plurality of television channels;
    storing a first program included within the plurality of television programs in a scrambled state on a memory associated with the first output device, the scrambled state being the same as a scrambled state used by the television service provider when transmitting the scrambled television signals; and
    transmitting the first program stored on the memory of the first output device to a second output device at the remote location without unscrambling the first program from the scrambled state.

2. The method of claim 1 further comprising the first output device being a STB and wherein a tuner of the STB tunes to a channel having the first program prior to storing the first program in the scrambled state on the memory.

3. The method of claim 2 further comprising transmitting the first program from the first output device to a third output device connected to the television network without unscrambling the first program from the scrambled state.

4. The method of claim 3 further comprising encrypting transmission of the first program from the first output device to the second output device and not transmission of the first program from the first output device to the third output device.

5. The method of claim 4 further comprising encrypting the first program according to a public-private encryption strategy.

6. The method of claim 5 further comprising, before transmission of the first program from the first output device to the second output device, unscrambling the first program for viewing on the first output device with a conditional access (CA) operation executing on the first output device.

7. The method of claim 6 further comprising, ater transmission of the first program from the first output device to the third output device, unscrambling the first program for viewing on the first output device with the CA operation executing on the first output device.

8. A method of facilitating playback of a television program comprising:
    with a first output device configured to output television signals for viewing, receiving a scrambled television program transmitted from a media provider, the scrambled television program having a scrambled state when received by the first output device;
    without altering the scrambled state of the scrambled television program as received from the media provider, storing the scrambled television program on a memory of the first output device;
    without altering the scrambled state of the scrambled television program as stored in the memory, retrieving the scrambled television program from the memory; and
    without altering the scrambled state of the scrambled television program as retrieved from the memory, transmitting the scrambled television program from the first output device to a second output device configured to output television signals for viewing.

9. The method of claim 8 further comprising the first output device receiving the scrambled television program over a secured network and transmitting the scrambled television program to the second output device over an unsecured network.

10. The method of claim 9 further comprising, without altering the scrambled state of the scrambled television program as retrieved from the memory of the first output device, transmitting the scrambled television program from the first output device over the secured network to a third output device configured to output television signals for viewing.

11. The method of claim 10 further comprising the first output device encrypting the scrambled television program when transmitting the scrambled television program to the second output device and not when transmitting the scrambled television program to the third output device.

12. The method of claim 11 further comprising the first output device requiring authorization from the media provider before transmitting over the secured network and not when transmitting over the unsecured network.

13. The method of claim 11 further comprising the first output device encrypting the scrambled television program with a public-private key such that the transmitted scrambled television program is encrypted and scrambled when transmitted from the first output device.

14. The method of claim 8 further comprising the first output device unscrambling the scrambled television program for viewing, the unscrambling of the scrambled television program altering the scrambled state of the television program only during viewing.

15. The method of claim 14 further comprising the first output device storing the scrambled television program on the memory in the scrambled state as received from the from the media provider during viewing of the scrambled television program.

16. A method of facilitating playback of a media program at a first output device, a second output device, and a third output device, the first and third output devices being connected to a secured network of a media provider and the second output device being in communication with the first output device by way of an unsecured network, the first, second, and third output devices being configured to playback the media program for a user, the method comprising:
the first output device receiving the media program from the media provider over the secured network in a scrambled, unencrypted state, the scrambled, unencrypted state requiring the media program to be descrambled, but not decrypted, before playback;
the first output device storing the media program on a memory of the first output device in the scrambled, unencrypted state as received from the media provider, the stored media program allowing the first output device to descramble the media program for playback without having to decrypt the media program;
the first output device encrypting the media program for transmission to the second output device over the unsecured network, the encrypting of the media program resulting in the media program, only when transmitted to the second output device, having a scrambled, encrypted state, the scrambled, encrypted state requiring the media program to be separately descrambled and decrypted before playback by the second output device; and
the first output device transmitting the media program in the scrambled, unencrypted state, as stored on the memory, to the third output device over the secured network, the transmitted media program allowing the third output device to descramble the media program for playback without having to decrypt the media program.

17. The method of claim 16 further comprising the media provider scrambling the media program according to a conditional access (CA) arrangement and the first output encrypting the media program according to a public-private key arrangement, the CA arrangement requiring each of the output devices to match decryption keys with encryption keys used by the media provider to scramble the media program, the public-private key arrangement requiring the second output device to correlate decryption keys with encryption keys used by the first output device to encrypt the media program.

18. The method of claim 16 further comprising the first output device storing the media program only in the scrambled, unencrypted state.

19. The method of claim 16 further comprising the first output device receiving the media program by tuning to a television channel transmitted over the secured network by the media provider.

20. The method of claim 19 further comprising the first output device storing the media program as the media program is being transmitted over the television channel such that a length of time taken to store the media program is approximately equal to a length of time taken to view the media program.

* * * * *

UNITED STATES PATENT AND TRADEMARK OFFICE
CERTIFICATE OF CORRECTION

| | | |
|---|---|---|
| PATENT NO. | : 7,907,728 B2 | Page 1 of 1 |
| APPLICATION NO. | : 11/290771 | |
| DATED | : March 15, 2011 | |
| INVENTOR(S) | : Clarke Stevens | |

It is certified that error appears in the above-identified patent and that said Letters Patent is hereby corrected as shown below:

Column 8, Line 19, Claim 7:

After "claim 6 further comprising" delete "ater"
And insert -- after --.

Column 9, Line 8, Claim 15:

After "scrambled state as received"
Delete "from the" (second occurrence)

Signed and Sealed this
Third Day of May, 2011

David J. Kappos
*Director of the United States Patent and Trademark Office*